United States Patent
Snipes et al.

(10) Patent No.: US 12,489,751 B1
(45) Date of Patent: Dec. 2, 2025

(54) SYSTEMS AND METHODS FOR UNAUTHENTICATED ACCOUNT OPENING

(71) Applicant: Live Oak Banking Company, Wilmington, NC (US)

(72) Inventors: Aaron Snipes, Durham, NC (US); Brant Wellons, Raleigh, NC (US); Brian Hyder, Pittsboro, NC (US); Douglas Gage Miller, Wilmington, NC (US); Justin Garrick, Charlotte, NC (US); Melissa Aubain, Virginia Beach, VA (US); Michael Finger, Wilmington, NC (US)

(*) Notice: Subject to any disclaimer, the term of this patent is extended or adjusted under 35 U.S.C. 154(b) by 50 days.

(21) Appl. No.: 18/680,735

(22) Filed: May 31, 2024

(51) Int. Cl.
*H04L 9/40* (2022.01)

(52) U.S. Cl.
CPC ...... *H04L 63/0884* (2013.01); *H04L 63/0807* (2013.01)

(58) Field of Classification Search
CPC .......................... H04L 63/0884; H04L 63/0807
See application file for complete search history.

(56) References Cited

U.S. PATENT DOCUMENTS

| | | | | |
|---|---|---|---|---|
| 8,250,633 | B2* | 8/2012 | Vedula | H04L 63/0815 713/168 |
| 9,268,933 | B2* | 2/2016 | Stecher | H04L 63/0421 |
| 10,104,059 | B2 | 10/2018 | Hockey et al. | |
| 10,333,705 | B2 | 6/2019 | Smith et al. | |
| 11,120,158 | B2 | 9/2021 | Hockey et al. | |
| 11,316,862 | B1 | 4/2022 | Pate et al. | |
| 11,430,057 | B1 | 8/2022 | Hockey et al. | |
| 11,503,010 | B2 | 11/2022 | Hockey et al. | |
| 11,869,005 | B2 | 1/2024 | Hockey et al. | |
| 11,887,069 | B2 | 1/2024 | Lai et al. | |
| 2003/0069857 | A1* | 4/2003 | Junda | G06Q 20/383 705/74 |
| 2023/0161902 | A1* | 5/2023 | Dong | G06F 21/6245 726/27 |
| 2024/0135337 | A1 | 4/2024 | Lai et al. | |

* cited by examiner

*Primary Examiner* — Amie C. Lin
(74) *Attorney, Agent, or Firm* — Dority & Manning, P.A.

(57) ABSTRACT

Systems and methods for unauthenticated account openings is disclosed. The system can receive, from a first computing system, a request. The method may include computing, based on the request, a foreign entity identifier, wherein the foreign entity identifier is associated with an unverified identity of the first computing system, and the foreign entity identifier identifies the request during one or more interactions with at least one endpoint of a second computing system. The method may include accessing, based on the request and the foreign entity identifier, one or more executable tasks, the executable tasks being executable by the first computing system. The method may include receiving status data associated with the executable tasks. The method may include generating, based on the status data, a new account that satisfies the request wherein the new account is associated with a verified identity of the first computing device.

20 Claims, 5 Drawing Sheets

SYSTEMS AND METHODS FOR UNAUTHENTICATED ACCOUNT OPENING

FIELD

The present disclosure generally relates to techniques for generating account records for indirect users of a computing system.

BACKGROUND

Frameworks that offer third-party service providers with open access to consumer data may give users more control over their data and provide improved access to services or products. However, integrating third-party services may facilitate inconsistent quality, limited communication standards, and accountability gaps with respect to security.

SUMMARY

Aspects and advantages of embodiments of the present disclosure will be set forth in part in the following description, or may be learned from the description, or may be learned through practice of the embodiments.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
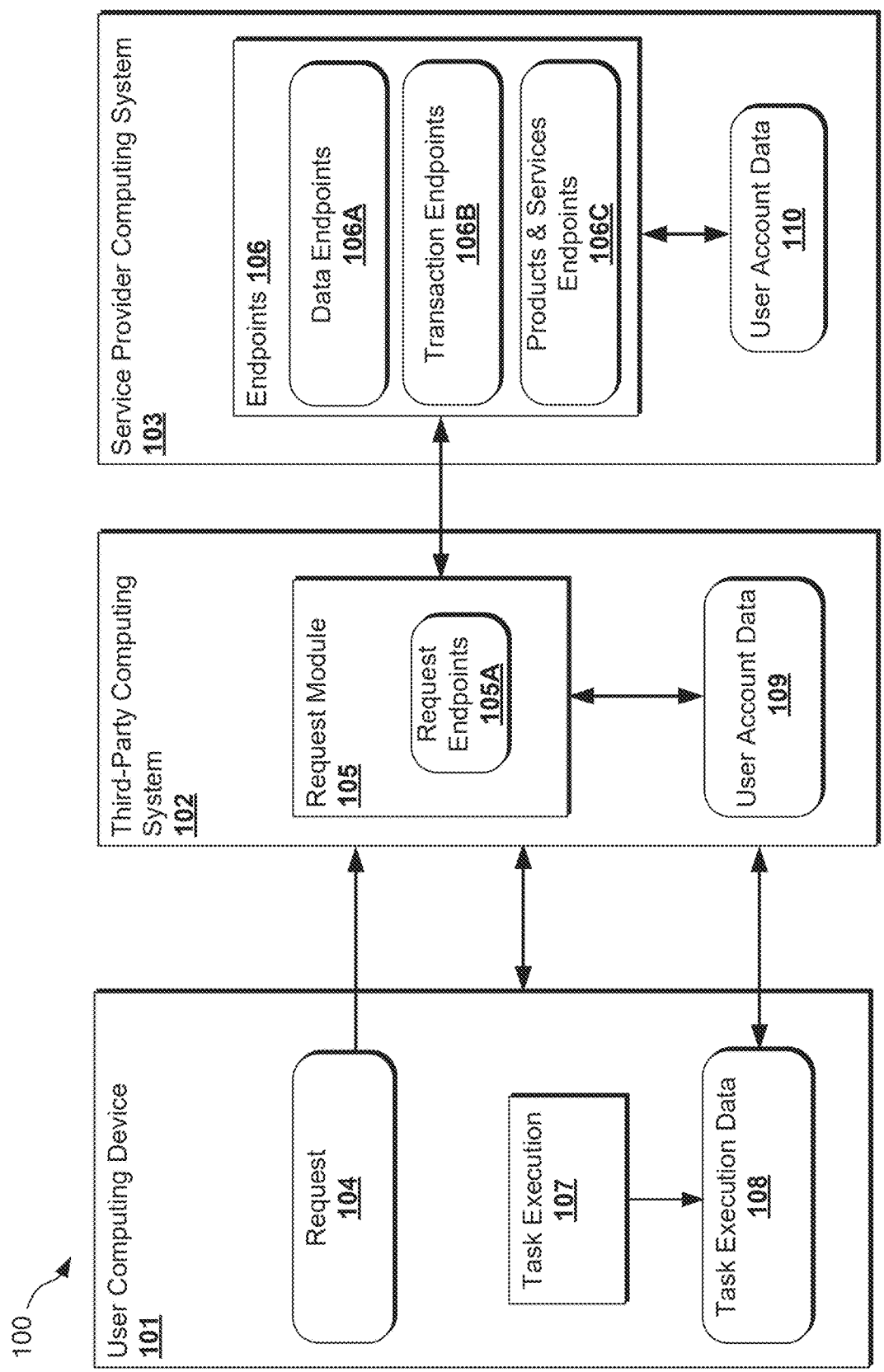
FIG. 1 depicts a dataflow pipeline according to example aspects of the present disclosure.

The present disclosure relates generally to techniques for generating accounts for indirect users of a computing system. More particularly, the present disclosure relates to generating user accounts and account credentials for unverified users through third parties using a foreign entity identifier. For instance, a service provider may utilize third parties to facilitate access to products or services. The third parties may interface with end users and enable the users to access the products or services of the underlying service provider. In an embodiment, a user may utilize a user computing device to interact with the third-party (e.g., third-party computing system) to submit a request for products or services. In some embodiments, the user may create account credentials specific to the third-party. The third-party may interact with the service provider (e.g., service provider computing system) and facilitate the user's request with the underlying service provider on behalf of the user. However, the service provider may not be able to verify the identity of the user or associate the request with user account data to respond to the request due to the third-party facilitating the interaction on behalf of the user. For instance, the user may additionally need account credentials associated with the underlying service provider to properly manage and provide the requested services or products.

Managing multiple credentials for the same or similar service can cause a poor user experience and create security and privacy concerns. For instance, a user who uses a third-party to request products or services may need to set up two sets of credentials (e.g., with the third-party and the service provider) either before or at the time of making a request for products or services. Prior systems shift the burden of the duplicative account configuration process to the user by redirecting the user to the underlying service provider to create an account or sign-in prior to allowing the user to submit a request. The user is then responsible for maintaining either the same credentials or different credentials for two separate entities which together offer a single service or product to the user. Prior systems maintain this approach due to the complexities involved in maintaining parity of credentials across two or more separate entity computing systems. For example, concatenating and maintaining different passwords across two or more different entity systems can cause issues such as service disruption if one password is updated and the other system is not notified. Furthermore, if the security posture of one of the entity systems changes (e.g., multi-factor authentication, rolling codes, etc.) after credentials have been configured, programmatically retrieving ephemeral or one-time use credentials may increase complexity and computing resources for all computing systems involved by attempting to ensure that the most recent credentials are used for communications. Moreover, maintaining a duplicative set of credentials or passwords across all computing systems presents privacy and security challenges as well. For instance, a compromised credential within one entity computing system may compromise the other entity computing systems or user computing device due to the same credentials being used.

Accordingly, implementations of the present disclosure propose a foreign entity identifier that allows third parties to initiate account generation (e.g., account openings) and credential generation without communicating user credentials specific to the third party and without forcing the user to create two sets of credentials. For example, a computing system associated with a service provider can receive a request from a third-party computing system. The request may indicate that a user interfacing with the third-party computing system is requesting products or services from the underlying service provider. In response to the request, the computing system associated with a service provider may compute a foreign entity identifier. The foreign entity identifier may include a token (e.g., API token, key, etc.) that identifies the unverified request (e.g., application, etc.) for services offered by the service provider until the request (e.g., application for a new account) can be associated with user account data specific to the service provider computing system.

In an embodiment, the foreign entity identifier may identify request during interactions with the third-party computing system by including the foreign entity identifier in each interaction with one or more endpoints of computing system associated with the service provider. For instance, the service provider computing system may access, based on the foreign entity identifier, one or more executable tasks that are needed to generate a new account to satisfy the request and credentials associated with the service provider computing system. By way of example, the one or more executable tasks may include disclosure forms which inform the user about policies and procedures associated with the underlying service provider or the requested product or service. Data associated with the one or more executable tasks may be transmitted (e.g., via the third-party computing system) to the user computing device where the user may acknowledge or attest to the disclosures (e.g., executing the executable tasks). For instance, the executable tasks may be rendered via the third-party computing system (e.g., on a display device associated with the user device). This may allow the user to complete the disclosure forms without having to navigate or interact directly with the service provider computing system. In an embodiment, the one or more executable tasks may be associated with an attestation workflow which generates status data to indicate a "completed" status once the executable tasks have been completed.

Accordingly, the service provider computing system may receive status data indicating the pre-requisite executable tasks (e.g., disclosures etc.) have been completed and trigger an account generation for the user. For instance, the service provider computing system may generate, based on the status data, account credentials specific to the service provider computing system that verifies the identity of the user. In an embodiment, the account credentials may also be associated with the request (e.g., application, etc.) such that a data object may be created that concatenates all information (e.g., disclosures, demographic, request metadata, etc.) received from the user prior to creating the new account and verifying the identity of the user. For instance, account credentials may include an authorization token or key (e.g., bearer token, etc.) identifying the user and may then be used to associate the user with a user profile data object when subsequent requests are received from the third party computing system on behalf of the user.

In an embodiment, the account credentials specific to the service provider computing system may be different to the account credentials specific to the third party computing system. For instance, the foreign entity identifier may be invalidated once the account credentials specific to the service provider computing system have been created and the account credentials (e.g., bearer token, etc.) specific to the service provider may be communicated to the third-party computing system. In this way, the third party computing system may identify and authenticate the user using its respective user account details and utilize the account credentials specific to the service provider computing system to facilitate verified communications with the service provider.

It should be noted that implementations described herein discuss the collection and utilization of various types of data. Any mention of data associated with users, as described herein, can be securely stored and protected against any type of unauthorized use or access. In addition, sensitive information, such as user data, is collected only with the express permission of said users. Users are provided the option to opt-out, or otherwise opt-in, to collection of such data.

Aspects of the present disclosure provide a number of technical effects and benefits. As one example technical effect and benefit, implementations of the present disclosure can substantially reduce the time required for users to set up new accounts and generate account credentials (e.g., open new accounts) for services or products where third-parties are used to interface with user, thus increasing user satisfaction and substantially reducing compute resources necessary to collect such information from users. For example, using conventional techniques, most account creation processes must necessarily collect redundant information from users to configure user accounts. However, by using a foreign entity identifier a more seamless user experience is created, eliminating the need to acquire redundant information, redirect the user between system, render duplicative account creations screens, and thus substantially reducing compute resources (e.g., power, memory, storage, compute cycles, etc.).

As another example technical effect and benefit, implementations of the present disclosure can substantially create flexibility and improve the security posture between separate computing systems. Specifically, third parties maintain the flexibility to implement distinct account creation and account security measures without impacting underlying service providers. Service providers also maintain flexibility to implement distinct account management and security policies without impacting third-party intermediaries. Implementations of the present disclosure also increase joint security by alleviating the need to render iframes, initiate redirects, etc., which may introduce unnecessary vulnerabilities (e.g., untrusted URLs, modified URLs, phishing scams, etc.) that may expose user credentials. By programmatically generating account credentials, rather than a manual creation by a user, implementations of the present disclosure can substantially reduce bandwidth utilization and increase trust and reliability.

Moreover, by generating a token or key (e.g., bearer token, etc.) instead of a username and password, the user account data may be more secure. For instance, the token or key may include an increased number of alphanumerical, may be encrypted at rest and in transit (e.g., HTTPS, TLS etc.), and may be routinely rotated with no impact to the end user. Thus, the technology of the present disclosure increases security of user account data across multiple entity computing systems.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations may be made to the embodiments without departing from the scope of the present disclosure. For instance, features illustrated or described as part of one embodiment may be used with another embodiment to yield a still further embodiment. Thus, it is intended that aspects of the present disclosure cover such modifications and variations.

FIG. 1 depicts an example data flow pipeline according to example aspects of the present disclosure. The following description of dataflow pipeline 100 is described within an example implementation in which a user associated with a user computing device 101 transmits a request 104 for products or services to a third-party computing system 102. The user may provide user account data 109 to the third-party computing system 102 in order to verify and authenticate the request 104 with the third-party computing system 102. In response to the request 104 the third-party computing system 102 may broker communications with a service provider computing system 103 in order to facilitate the requested product or service on behalf of the user (e.g., user computing device 101). The service provider computing system 103 may determine the request 104 is not associated with any existing account credentials (e.g., user account data 110) and facilitate communications with the user computing device 101 (e.g., via the third-party computing system 102) using a foreign entity identifier to respond to the request 104 and generate account data 110 (e.g., account credentials) using one or more endpoints 106.

The user computing device 101 may include a computing device owned or otherwise accessible to a user. For instance, the user computing device 101 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user computing device 101 may include one or more input components such as buttons, a touch screen, a joystick or other cursor control, a stylus, a microphone, a camera or other imaging device, a motion sensor, etc. The user computing device 101 may include one or more output components such as a display device (e.g., display screen), a speaker, etc. In an embodiment, the user computing device 101 may include a component such as, for example, a touchscreen, configured to perform input and output functionality to receive user input and present information for the user.

The user computing device 101 may execute one or more instructions to run an instance of a software application or a web browser and present user interfaces associated therewith, as further described herein. In an embodiment, the launch of a software application or web browser may initiate a user-network session (e.g., communication channel, etc.) with the third-party computing system 102.

For instance, the user computing system 101 and the third-party computing system 102 may communicate over one or more networks. In an embodiment, the user computing system 101 and the third-party computing system 102 may communicate according to a client-server relationship. The networks may be any type of network or combination of networks that allows for communication between devices. In some implementations, the networks may include one or more of a local area network, wide area network, the Internet, secure network, cellular network, mesh network, peer-to-peer communication link or some combination thereof and may include any number of wired or wireless links. Communication over the networks may be accomplished, for instance, via a network interface using any type of protocol, protection scheme, encoding, format, packaging, etc. In an embodiment, communication between the user computing device 101 and the third-party computing system 102 may be facilitated by near field or short range communication techniques (e.g., Bluetooth low energy protocol, radio frequency signaling, NFC protocol).

The user computing device 101 and the third-party computing system 102 may communicate using one or more application programming interfaces (APIs). This may include external facing APIs to communicate data from one system/device to another. The external facing APIs may allow the systems/devices to establish secure communication channels via secure access channels over the networks through any number of methods, such as web-based forms, programmatic access via RESTful APIs, Simple Object Access Protocol (SOAP), remote procedure call (RPC), scripting access, etc.

While examples herein describe a usage of APIs, the present disclosure is not limited to such embodiment. For instance, the user computing device 101 and the third-party computing system 102 may communicate using any type of digital communications such as real-time communication techniques or bi-directional communication channels. Examples of bi-directional communication channels are not limited to but may include WebSocket, Server-Sent Events (SSE), Long Polling, Message Queuing Telemetry Transport, (MQTT), Web Real-Time Communications (WebRTC), etc.

The user computing device 101 may transmit a request 104 over the networks to the third-party computing system 102. The request 104 may include data generated in response to user input indicating a request for a product or service. For example, a user may interact with the user computing device 101 and access an application or a web browser. The application or web browser may be a client in a client-server relationship enabling the user to submit requests (e.g., over networks) to one or more servers of the third-party computing system 102.

By way of example, a user may access a form via a web application associated with a third-party computing system 102 and provide user input by submitting information associated with a request 104 for products or services. For instance, the submission of the form may cause a request 104 (e.g., API request, etc.) to be transmitted to the third-party computing system 102. The request 104 may include a digital request for information using any number of methods, such as web-based forms, programmatic access via RESTful APIs, Simple Object Access Protocol (SOAP), remote procedure call (RPC), scripting access, etc.

The request 104 may indicate a particular product or service the user is requesting. For instance, within the body of the request 104, one or more fields (e.g. JSON object, fields, etc.) may indicate a specific product or service the user has expressed interest in. For example, the form or questionnaire completed by the user via the user computing device 101 may indicate an intent to apply for a financial loan with a financial service provider. As such the request 104 may include a "request type" field which includes a "financial loan" value to indicate the user is requesting a financial loan. The request 104 may be transmitted to one or more servers of the third-party computing system 102.

The third-party computing system 102 may include one or more computing devices. For instance, the third-party computing system 102 may include a control circuit and a non-transitory computer-readable medium (e.g., memory). The control circuit of the third-party computing system 102 may be configured to perform the various operations and functions described herein. Further description of the computing hardware and components of third-party computing system 102 is provided herein with reference to other figures.

The third-party computing system 102 may include software technologies associated with a third-party entity related to or unrelated to an underlying service provider computing system 103. For instance, the third-party computing system 102 may include a cloud-based server system or application that is configured to interface with end users (e.g., user computing devices 101) and orchestrate product and service offerings from a plurality of service providers to provide the end users with optimized options for their respective requests 104. In some embodiments, the third-party computing system 102 may be related to the underlying service provider computing system 103 (e.g., subsidiaries, partnerships, etc.). In other embodiments, the third-party computing system 102 may be unrelated (e.g., separate entities, etc.) to the underlying service provider computing system 103.

By way of example, the third-party computing system 102 and service provider computing system 103 may orchestrate financial products or services for users using an open banking framework. For instance, the third-party computing system 102 may be associated with a Fintech (e.g., financial technology) entity and the service provider computing system 103 may be associated with a financial institution (e.g., banks, etc.). Together the third-party computing system 102 and the service provider computing system 103 may orchestrate financial products and services for users.

While examples herein may refer to financial entities, the present disclosure is not limited to such embodiment and may be used in any industry which includes primary providers of products and services and third-parties that engage with end user.

The third-party computing system 102 may include one or more servers within a client-server relationship with the user-computing device 101 allowing for interactions with the user computing device 101. For instance, the user computing device 101 may run a client (e.g., web client, application client, etc.) configured to communicate with servers of the third-party computing system 102. The third-party computing system 102 may include one or more back-end services for offering services or products. For instance, the third-party computing system 102 may include a request module 105 configured to receive requests 104 and broker a relationship to a service provider computing system 103 (e.g., service provider) to provide the requested products or services.

The request module 105 may include software running on one or more servers of the third-party computing system. For instance, the request module may be implemented using a microservices architecture where one or more services are configured to perform discrete tasks to facilitate and broker a relationship between the user computing device 101 and the underlying service provider computing system 103. For example, the request module 105 may include a plurality of request endpoints 105A. Request endpoints 105A may include API endpoints associated with one or more APIs that are exposed to user computing devices 101. In an embodiment, the request endpoints 105A may include a plurality of ports configured to "listen" for a particular internet protocol. The request endpoints 105A may receive a request 104 and orchestrate communications with the service provider computing system 103 to return a response to the request 104. An example of the third-party computing system orchestrating communications with the service provider computing system 103 is further described with reference to FIGS. 2A-B.

The third-party computing system 102 may receive the request 104 and determine whether the user associated with the user computing device 101 has an associated user account (e.g., user account data). For instance, the user may be required to first create user account credentials specific to the third-party computing system 102 in order to interact with the third-party computing system 102. In an embodiment, the third-party computing system 102 may identify and authenticate the user (e.g., user computing device 101) by determining valid user account 109 data exists. In another embodiment, the third-party computing system 102 may instruct the user to first create user account data 109.

In response to verifying user account data 109 associated with the user computing device 101, the third-party computing system 102 may utilize the request module 105 to generate and transmit one or more API requests to the service provider computing system 103. The one or more API requests may indicate to the service provider computing system 103 that a user is requesting products or services. By way of example, the one or more API requests may include a GET request to retrieve data associated with products or services offered by the service provider computing system. A GET request may be used to retrieve information from a server (e.g., server of the service provider computing system 103) using a URL (e.g., endpoints 106). The GET request may be authorized by a bearer token associated with the third-party computing system 102. For instance, the third-party computing system 102 may have a formal or informal relationship with the underlying service provider computing system 103 and may be pre-authorized to retrieve data to present to end users.

The service provider computing system 103 may include one or more computing devices. For instance, service provider computing system 103 may include a control circuit and a non-transitory computer-readable medium (e.g., memory). The control circuit of the service provider computing system 103 may be configured to perform the various operations and functions described herein. A further description of the computing hardware and components of service provider computing system 103 is provided herein with reference to other figures.

For instance, the service provider computing system 103 may include a cloud-based system associated with an entity that offers products or services. For instance, the service provider computing system 103 may include software configured to provide products and services directly to end users (e.g., user computing devices 101) and indirectly through third parties (e.g., third-party computing systems 102). In an embodiment, the service provider computing system may be a financial institution which offers financial products or services directly or indirectly (e.g., via third-party computing systems 102) to users.

The service provider computing system 103 may include a plurality of endpoints 106 associated with one or more APIs (application programming interfaces). The endpoints 106 may indicate a specific location within an API that accepts requests (e.g., API requests, requests 104, etc.) and sends back responses. For instance, the endpoints 106 may enable the service provider computing system 103 to communicate with different systems (e.g., user computing device 101, third-party computing system 102, etc.) and applications, by sending and receiving information and instructions via the endpoints 106.

For instance, the endpoints 106 may include data endpoints 106A, transaction endpoints, 106B, and/or products and services endpoints 106C. Data endpoints 106A may be configured to accept API requests and return specified data sets (e.g., retrieve all products and services, etc.). Transaction endpoints 106B may be configured to accept API requests and perform one or more tasks or execute one or more transactions (e.g., account credential generation, etc.). The products and services endpoints 106C may be associated with respective products or service offerings and may be configured to receive requests and interact with data specific to a respective product or service.

While examples herein describe data endpoints 106A, transaction endpoints 106B, and products and services endpoints 106C, the present disclosure is not limited to such embodiment and may include additional API endpoints, or other software which execute instructions. In fact, the data endpoints 106A, transaction endpoints 106B, and products and services endpoints 106C may be a subset of a plurality endpoints 106 exposed by the service provider computing system 103. A superset of endpoints 106 may additionally include private API endpoints and other public API endpoints. Example software which execute instruction may also include but are not limited to CRON (command-line utility) jobs, Lambda functions, Azure Functions, etc.

In an embodiment, the service provider computing system 103 may associate API requests with user account data 110. For instance, in order to interact with or access data through the endpoints, a form of authorization may be required. The authorization may include an authorization token associated with the third-party computing system 102 or the user computing device 101. For instance, the service provider computing system 103 may provide the third-party computing system 102 with a token authorizing the third-party computing system 102 to interact with the one or more endpoints 106.

By way of example, the endpoints 106 of the service provider computing system 103 may receive the GET request requesting products or services and produce a response. The response may be in the form of JSON, XML, HTML, etc., and provide the third-party computing system 102 with an array (e.g., list, etc.) of all products or services related to the request 104. For instance, the data endpoint 106A, in response to an API request that indicates "loan" may return an array of all financial loan products or services. The third-party computing system 102 may receive the response indicating the list of products or services and generate or update a user interface display via the user computing device 101 to present the list of products and services to the end user.

In an embodiment, in addition to the array of products and services associated with the request, the service provider computing system 103 may determine that one or more executable tasks are necessary to offer one or more products or services included within the array of products or services. For instance, the products and services endpoint 106C may access one or more executable tasks associated with respective products or services within the array. The one or more executable tasks may include software instructions associated with a task to be executed via the user computing device 101. For instance, each product or service offering may require the user to complete pre-requisite tasks. The tasks may include, but are not limited to disclosure forms, clarifying information, documentation uploads, etc. As such the service provider computing system 103 may also return a response associated with one or more executable tasks to be completed by the user via the user computing device 101.

However, the service provider computing system 103 may not be able to associate the API request for products and services with user account data 110. For instance, the initial GET request may only include authorization token associated with the third-party computing system 102 and may not include user account data 110 associated with the end user for whom the request 104 should be fulfilled. As such the servicer provider computing system 103 may generate a foreign entity identifier indicating the authorized third-party computing system 102 and the unverified user computing device 101 which initiated the original request 104. The foreign entity identifier may include a string of unique alphanumerical characters associated with the particular GET request (e.g., API request) from the third-party computing system 102 and subsequent related data or communications. In an embodiment, the foreign entity identifier may identify the request (e.g., request 104) submitted by the user via the third-party computing system 102 until the user computing device 101 from which the request (e.g., request 104) originated can be verified. An example of generating a foreign entity identifier and utilizing it to associate subsequent communications is further described with reference to FIG. 2B.

In an embodiment, the additional response including the executable tasks may be returned concurrently with the array of all products or services and rendered in response to user input selecting the associated product or service. In other embodiments, the endpoints 106 may await an additional API request in response to array of products and services to return the one or more executable tasks.

The array of products and services may be presented to the user via a user interface display on the user computing device in response to the request 104. The user may interact with the user interface to provide user input by selecting one or more products or services. For instance, the user may select an SBA (small business administration) loan product. As discussed, the third-party computing system 102 may iteratively generate a secondary API request associated with the user input (e.g., loan product selection) or may update the user interface to display the one or more executable tasks associated with the loan product based on receiving the associated executable tasks concurrently with the array response.

In an embodiment, the one or more executable tasks may facilitate execution of one or more disclosure forms which may need to be acknowledged or attested by the user. For instance, the one or more executable tasks may include a link (e.g., hyperlink, redirect, etc.) to a static location where the disclosure form may be reviewed, signed, acknowledged, and/or attested. In an embodiment, the one or more executable tasks may include a third-party service which facilitates the acknowledgement and/or attestation process. For instance, the user may be redirected to a third-party entity to execute the one or more executable tasks.

In an embodiment, the user computing device 101 may include a task execution module 107 configured to receive the executable tasks, track the status or progress of the executable tasks to generate task execution data 108 as the user executes them. The task execution module 107 may include software being executed by one or more processors of the user computing device 101. For instance, the task execution module 107 may be included as software within the application client running on the user computing device 101. In an embodiment, the task execution module 107 may be stored in local memory (e.g., of the user computing device 101) or execute ephemerally (e.g., during the active user session). For instance, the task execution module 107 may be configured to track the overall status of the request 104 and the status of the respective executable tasks through its processing lifecycle. The status may be stored locally on the user computing device 101 or stored within one or more data stores within the third-party computing system 102 where it may be accessed by the task execution module 107.

Task execution data 108 may include any digital message (e.g., API calls, messages, etc.) which can be transmitted over a network. For instance, the task execution module 107 may, in response to user input executing one or more executable tasks, generate messages to transmit to the third-party computing system 102. The messages may include a message body including the user input (e.g., integers, strings, floats, arrays, etc.) input by the user. The messages may be validated prior to transmitting the message.

The task execution module 107 may receive the executable tasks and actively generate task execution data 108 as the user executes the executable tasks. For instance, the user may be prompted with a first executable task which instructs the user to complete a disclosure form. The user may complete the disclosure form and the task execution module 107 may generate task execution data 108 (e.g., status data) indicating the first executable task has been completed (e.g., completed status). In an embodiment, the task execution module 107 may update the status of the first executable task to completed once executed. In another embodiment, the task execution module 107 may track and update the status of all executable tasks until each have been completed.

In an embodiment, the task execution module 107 may facilitate an attestation workflow. An attestation workflow may include a series of steps in which the user executes an executable task by attesting to one or more documents or disclosure forms. By way of example, the task execution module 107 or a third-party may receive software instructions indicating a document or disclosure should be attested by the user. The task execution module 107 or third-party may provide the user with a set of instruction to sign or otherwise confirm the document and attest to its contents. In an embodiment, the task execution module 107 or third-party may provide instructions to affirm the authenticity of the user's signature. In response to the user executing the prompted instructions, the task execution module 107 may generate task execution data 108 indicating the status (e.g., status data) of the attestation workflow as being complete. In an embodiment, the attestation workflow, may trigger generation of account credentials by the service provider computing system 103. An example of triggering generation of account credentials is further described with reference to FIG. 2B.

In an embodiment, the task execution module 107 may transmit task execution data 108 including status data to the third-party computing system 102. For instance, because the third-party computing system 102 may be responsible for brokering the relationship between the user computing device 101 and the service provider computing system 103, the third-party computing system may poll (e.g., consistently check) the task execution module 107 and iteratively transmit status data (e.g., task execution data 108) to the service provider computing system 103. For example, the once the service provider computing system 103 receives status data indicating that all executable tasks have been completed, the service provider computing system 103 may proceed with further processing of the request for products or services. An example of further processing of the request is further described with reference to FIG. 2A.

Figure 2A:
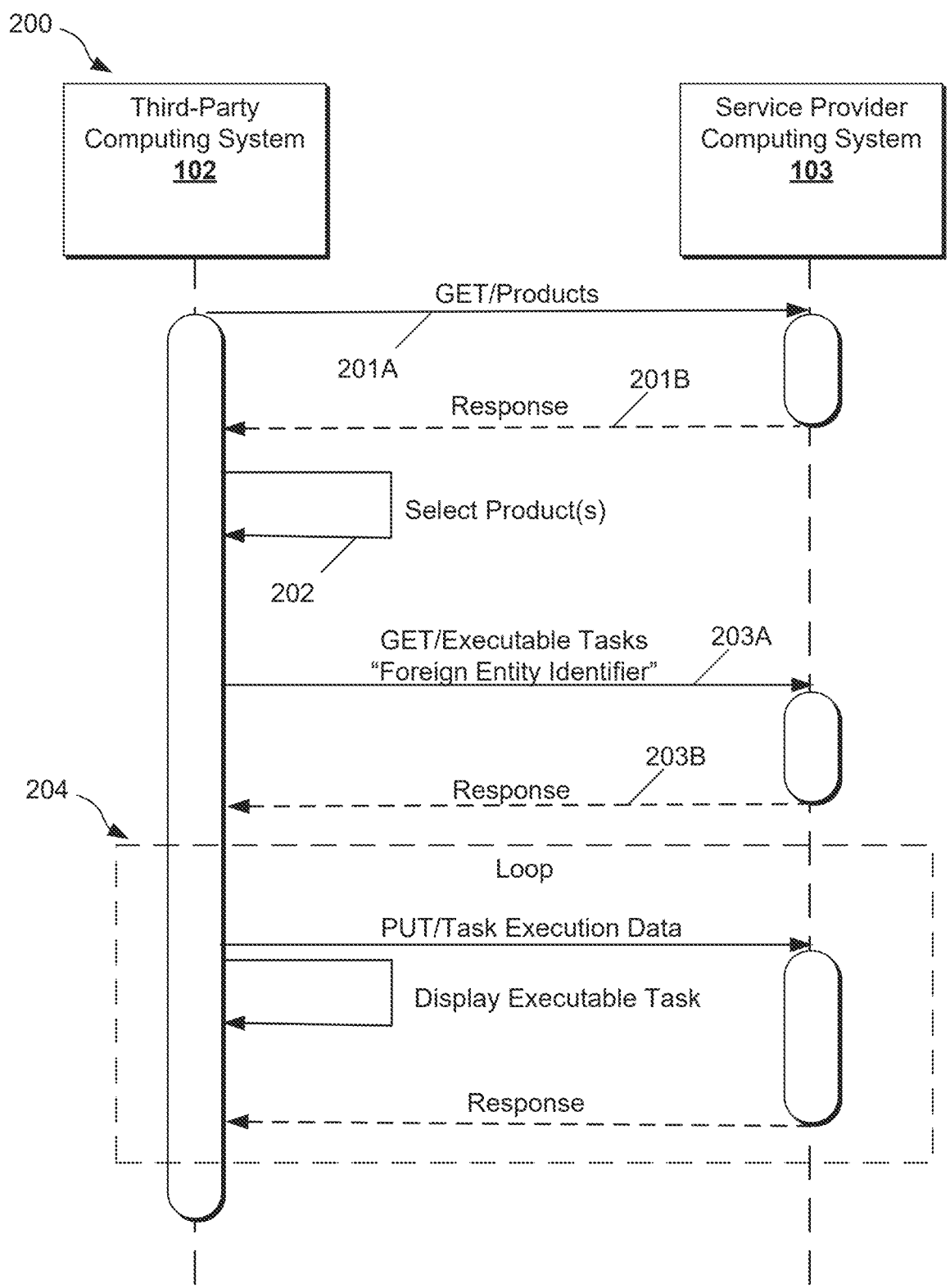
FIG. 2A depicts a flowchart diagram of an example process for accessing executable tasks according to example aspects of the present disclosure.

FIG. 2A depicts a flowchart diagram of an example process for accessing executable tasks according to example aspects of the present disclosure.

At (201A) the third-party computing system 102 may transmit a GET request to the service provider computing system 103. The GET request may be in response to a request 104 from a user computing device 101 requesting one or more products or services that align with products and services offered by the service provider computing system 103. In an embodiment, the GET request may be an API request that is received by an exposed API endpoint associated with the service provider computing system 103.

By way of example, the service provider computing system 103 may include a plurality of endpoints 106 configured to receive requests and return a response. For instance, the service provider computing system 103 may include a data endpoint 106A configured to return "public" data in response to an API request. Public data may include information that is generally available to the public (e.g., third-party computing systems 102, etc.) such as public offerings of products or services. As such the data endpoint 106A may receive the request and be configured to generate a response.

At (201B) the data endpoint 106A may generate a response to the API request. The response may include or be associated with a response status code. Response status codes may be used to provide an indication to the transmitting system (e.g., third-party computing system 102) that the request was received or rejected and provide context to information included in the response. Example response codes may include a status code of 200 indicating the API request has succeeded in retrieving the requested information (e.g., array of products, services, etc.), 201 indicating the request was accepted and a new resource (e.g., user account credentials, data objects, etc.) were created as a result, 202 the request was accepted, but not completed (e.g., due to latency issues, etc.), etc.

In an embodiment, the response may be received by the third-party computing system 102 and the data (e.g., array of products, services, etc.) included in the response may be used to generate or update a user interface display that is presented to the user (e.g., via the user computing device 101 etc.). For instance, the user associated with the user computing device 101 may be presented (e.g., via the third-party computing system 102) with one or more options of products or services offered by the service provider computing system 103.

At (202) the user may select one or more products or services from the one or more options presented (e.g., via the user computing device 101). For instance, the user may provide user input by "clicking" one or more products or services. In an embodiment, the selections may be received by the third-party computing system 102 and used to formulate additional API requests to the service provider computing system 103. By way of example, the user input indicating a "brokerage account" product may be captured by the third-party computing system 102. The third-party computing system 102 may input the "brokerage account" string into an API request to begin the process of applying or otherwise opening a brokerage account with the service provider computing system (e.g., service provider).

However, due to the third-party computing system 102 brokering communications between the user computing device 101 and the service provider computing system 103, the service provider computing system 103 may be unable to associate the application or new account request with any existing user account data 110. For instance, the third-party computing system 102 may be utilizing an authorization or bearer token to securely communicate with the service provider computing system 103 which does not identify the end user. In order to properly respond, the service provider computing system 103 may programmatically facilitate an account opening prior to verifying the identity of the end user.

For instance, at (203A) the third-party computing system 102 may transmit a GET request requesting one or more executable tasks associated with the brokerage account product selected by the user. The one or more executable tasks may be pre-requisite tasks needed to open the brokerage account. For instance, the one or more executable tasks may include one or more disclosure forms which need to be attested or acknowledged by the user.

In response to the GET request requesting the one or more executable tasks needed to open the brokerage account, the service provider computing system 103 may generate a foreign entity identifier to identify the application or new account prior to concatenating the application or new account to user account data 110 (e.g., account credentials). The foreign entity identifier may include a string of alpha numerical characters that identify a communication from an unverified user, a new account request, etc. The foreign entity identifier may be randomly generated instantaneously upon receipt of the request or pre-determined and assigned to a request when received. In some embodiments, the foreign entity may be unique to a particular request or set of requests (e.g., nested requests for multiple products, services, etc.).

In other embodiments, the foreign entity identifier may be associated with other foreign entity identifiers. For instance, the user may request a brokerage account product and a loan product. As a result, a parent foreign entity identifier may be concatenated with a child foreign entity identifier to respectively identify the broker account (e.g., parent) and loan (e.g., child) products. The parent child relationship may be determined randomly, in order of selection by the user, or based on the complexity of executable tasks associated with each. For instance, the loan application may be associated with ten executable tasks and the broker account may be associated with four. Of the four executable tasks associated with the broker account product, three may be duplicative tasks associated with the loan product. As such the loan product may be assigned a parent foreign entity identifier and the brokerage account may be assigned the child foreign entity identifier due to the loan product being associated with additional executable tasks needed to open the accounts. In other embodiments, a single foreign entity identifier may identify a plurality of requests for new accounts.

In an embodiment, the user may not be associated with existing user account data 110 specific to the service provider computing system 103. For instance, the user may not have user credentials to authenticate with the service provider computing system 103. In another embodiment, the user may be associated with user account data 110 specific to the service provider computing system 103. For instance, the user may have account credentials already configured. However, to alleviate the need for the user to provider user account data 109 to the third-party computing system 102 and the service provider computing system 103 at the onset of the request for a new account, the foreign entity identifier may be used to identify the user and new account request until user account data 110 specific to the service provider computing system 103 can be associated with the new account.

The service provider computing system 103 may receive the GET request requesting the one or more executable tasks, generate a foreign entity identifier, and access the one or more executable tasks associated with the request product (e.g., new account). For instance, a products and services endpoint 106C may retrieve the one or more disclosures which need to be attested to or acknowledged by the requesting user and transmit data back to the third-party computing system 102 to facilitate the execution (e.g., attestation workflow, etc.) of the one or more executable tasks.

For instance, at (203B), in response to the GET request requesting the one or more executable tasks, the service provider computing system 103 may return a response (e.g., response code 200, 201, etc.) indicating that the request has been accepted and providing data associated with the one or more executable tasks. By way of example, the data associated with the one or more executable tasks may include one or more links to static versions of the disclosure documents. The third-party computing system 102 may render a user interface via the user computing device to provide the one or more links to the user with instructions to attest or acknowledge the disclosure documents. In another example, the data associated with the one or more executable tasks may include instructions to trigger a subsequent API request to a third party attestation or acknowledgement provider. For instance, a third-party different than the third-party computing system 102 may be used to facilitate the attestation and acknowledgement of disclosure documents.

While examples, herein described the one or more executable tasks as disclosure documents, the present disclosure is not limited to such an embodiment and may include any task completed by a user prior to providing products or services. Examples include, but are not limited to credit check, document uploads (e.g., personal records, financial statements, etc.), notarization, initial funding payments, etc.

At (204) the third-party computing system 102 may render a user interface which displays the one or more executable tasks (e.g., via the user computing device 101) to the user. As the user iteratively executes the one or more executable tasks the task execution module 107 may generate task execution data 108 which may be transmitted via the third-party computing system 102 to the service provider computing system 103. For instance, the third-party computing system 102, in response to task execution data 108 generated by the task execution module 107, may generate a PUT request (PUT API request, etc.) including status data associated with the one or more requests. A PUT request may include a new resource or replace a representation of the target resource with a request payload. In an embodiment, the PUT request may be tagged with the foreign entity identifier such that the service provider computing system 103 may associate the PUT request with the initial request for a new account (e.g., brokerage account, etc.)

By way of example, the PUT request may include status data indicating a status associated with the one or more executable tasks previously transmitted from the service provider computing system 103. For example, the service provider computing system 103 may maintain a data object (e.g., new account data object, etc.) associated with the GET request to retrieve executable tasks. The data object may be identified by the foreign entity identifier. In an embodiment, the one or more executable tasks associated with the data object may include a task identifier (e.g., task_id) and a status. For instance, the servicer provider computing system 103 may return a response providing data associated with the one or more executable tasks and store a status of incomplete. As such, a PUT request providing updated status data associated with the one or more executable tasks may update the associated status of the respective executable tasks. For instance, the service provider computing system 103 may analyze the PUT request, determine, based on the foreign entity identifier, an associated data object and ingest the payload including the status data to update the status of the executable tasks to a complete status.

As the user iteratively completes the one or more executable tasks, the third-party computing system 102 may iteratively display an updated list of outstanding executable tasks and transmit PUT requests to provide status updates to the service provider computing system 103. Once all the executable tasks have a complete status, the service provider computing system 103 may respond with an indication that the request (e.g., application for new product, service, etc.) may proceed processing. For instance, the response may prompt the third-party computing system 102 to completely populate the data object (e.g., object fields, etc.) with information needed to open the account. In an embodiment, the service provider computing system 103 may initial the data object and await a request to populate the data object and proceed with generating user account credentials, verifying existing account credentials, and opening the requested account (e.g., providing the requested product or service). An example of each is further described with respect to FIG. 2B.

Figure 2B:
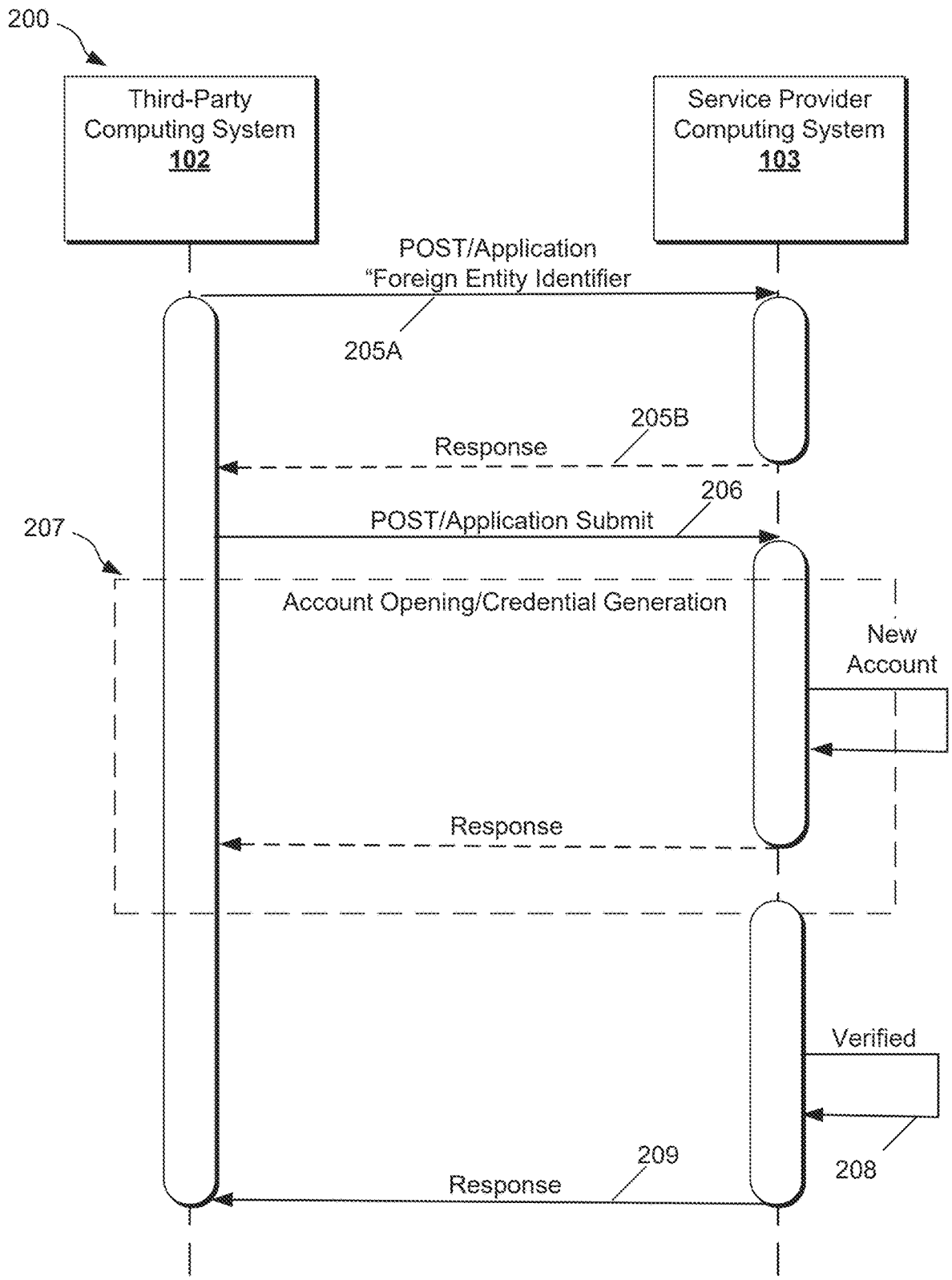
FIG. 2B depicts a flowchart diagram of an example process for generating account credentials according to example aspects of the present disclosure.

FIG. 2B depicts a flowchart diagram of an example process for generating account credentials according to example aspects of the present disclosure.

At (205A) the third-party computing system 102 may generate a POST request (e.g., API request, etc.) after acquiring any outstanding information from the user. A POST request may include requests that a web server (e.g., service provider computing system 103, etc.) accepts the data (e.g., data needed to open the account) enclosed in the body of the POST request message. In an embodiment, a POST request may also request that the service provider computing system 103 store the data within the body of the request. The POST request may also indicate the foreign entity identifier that has been associated with the series of communications between the third-party computing system 102 and the service provider computing system 103.

Based on the foreign entity identifier, the service provider computing system 103 may identify the application (e.g., initial request for products, services, etc.) associated with a data object. For instance, the data object may store all information received via the communications between the third-party computing system 102 and the service provider computing system 103. As such the POST request, once received by the service provider computing system 103 may populate the data object associated with the new account.

At (205B) the service provider computing system 103 may return a response indicating that the PUT request and the associated data has been accepted and stored (e.g., within the data object). The response may also indicate that that the application is ready for submission. For instance, the application (e.g., request for a new account, product, service, etc.) may need to be reviewed manually by personnel associated with the service provider computing system 103. For example, a manual review may identify any other executable tasks which may need to be included with the application.

Once all criteria for the application have been satisfied an option may be presented to the end user to proceed with formally submitting the application for a new account. For instance, the user interface of the user computing device 101 may be updated to present a "submit" user interface element that allows the user to submit the application. In an embodiment, the user may also have an opportunity to change or modify the application prior to submitting.

At (206) a POST request may be transmitted indicating the user's intent to formally submit an application for one or more products or services. For instance, the user may "click" or otherwise indicate an intent to submit the application via the user computing device 101. The third-party computing system 102 may receive the user input indicating the user's intent to submit the application and generate a POST request to submit the application and the associated data. For instance, the POST request may trigger the service provider computing system 103 to fulfill the initial request for products or services, by opening a new account associated with the requested product. In an embodiment, the POST request may also include the foreign entity identifier such that the service provider computing system 103 may associate the PUT request with the application (e.g., data object) previously generated for the associated request.

In an embodiment, the service provider computing system 103 may concatenate all previously received data (e.g., executable tasks, etc.) associated with the foreign entity identifier with the new account. In this way, the newly generated account is seamlessly associated with user input provided by the unverified user enabling the servicer provider computing system to open a new account prior to verifying the users account.

At (207) The service provider computing system 103 may receive the POST request indicating the submitted application and process the application (e.g., using the data associated with the data object. In an embodiment, the service provider computing system 103 may generate a new account and new account credentials. For instance, the POST request may include sufficient information to generate user account data to identify the user (e.g., including personal information, contact information, demographic information, etc.) and open the request account. In some embodiments, the POST request may include a threshold amount of data to associate the user with existing user account data.

By way of example, the service provider computing system 103 may utilize the data included in the POST request to generate a new account of the type requested by the user. For instance, the new account may be configured based on the information provided through the iterative communications between the third-party computing system 102 and the service provider computing system 103.

If a determination is made that the user identified by the data included in the POST request and/data object is not associated with a user account within the user account data 110, the service provider computing system 103 may generate new user credentials for the user. For instance, the service provider computing system 103 may utilize the data included in the POST request and/data object to generate a new user account credential (e.g., new user account data 110) for the user. In an embodiment, the new user account credentials may include a computer generated username and a temporary password. In another embodiment the new user account may include configuration instructions to utilize an ephemeral code. In other embodiments, the new user account credentials may include an authorization or bearer token that is only communicated to the third-party computing system 102.

For instance, the third-party computing system 102 may maintain its interfacing relationship with the end user throughout the lifespan of the product or service. For instance, the user may only interact with the third-party despite the underlying service provider providing the product or service. As such the user may not need to directly communicate with or "sign-in" to the service provider computing system 103 direct such that all communications are brokered through the third-party computing system. To alleviate the end user maintaining multiple sets of user credentials, the authorization or bearer token (e.g., new user account credential) associated with the user account data 110 may be provided in the response to the third-party computing system 102. In an embodiment, the authorization or bearer token associated with the user account data may be used for subsequent communications between the third-party computing system 102 and the service provider computing system 103. For instance, the authorization or bearer token may only provide the user with access to their specific account information. In this way the user may maintain a single set of user account data 109 specific to the third-party computing system 102 and service provider computing system 103 may be able verify the user in its communications with the third-party computing system 102.

The service provider computing system 103 may also determine whether the end user has user account data 110 specific to the service provider in order to verify the user. For instance, at (208) the service provider computing system 103 may compare data received from the POST request and the data object to user account data. Based on a determination that one or more identifying parameters (e.g., name, address, contact information, etc.) included in the user account data 110 satisfy a threshold number of identifying parameters include in the POST request and/or the associated data object match, the service provider computing system 103 may concatenate the new user account to the associated user account data 110 and verify the account. For instance, the user account data 110 associated with the now verified user may be updated to indicate a new account has been opened for the user.

The service provider computing system 103 may invalidate the foreign entity identifier and associate the data object and new account with user account data 110. In an embodiment, the service provider computing system 103 may only allow access to data or resources associated with the newly created account with the newly created account credential (e.g., authorization key, bearer token, etc.). Once verified, the third-party computing system 102 may utilized the verified user credentials in communications with the service provider computing system 103.

At (209) any requests received by the service provider computing system 103 may receive a response based on whether the service provider computing system 103 could verify the user account data 110 (e.g., matching authorization key, bearer token, etc.). In an embodiment, once the account has been created communications that cannot be verified may receive a response including a status code indicating the request has not been accepted. Examples status codes may include a 401 error indicating the client's identity (e.g., user computing device, etc.) is known but not authorizes, a 403 error indicating that the client (e.g., user computing device, etc.) request has been rejected because the client does not have rights to access the content, etc.

Figure 3:
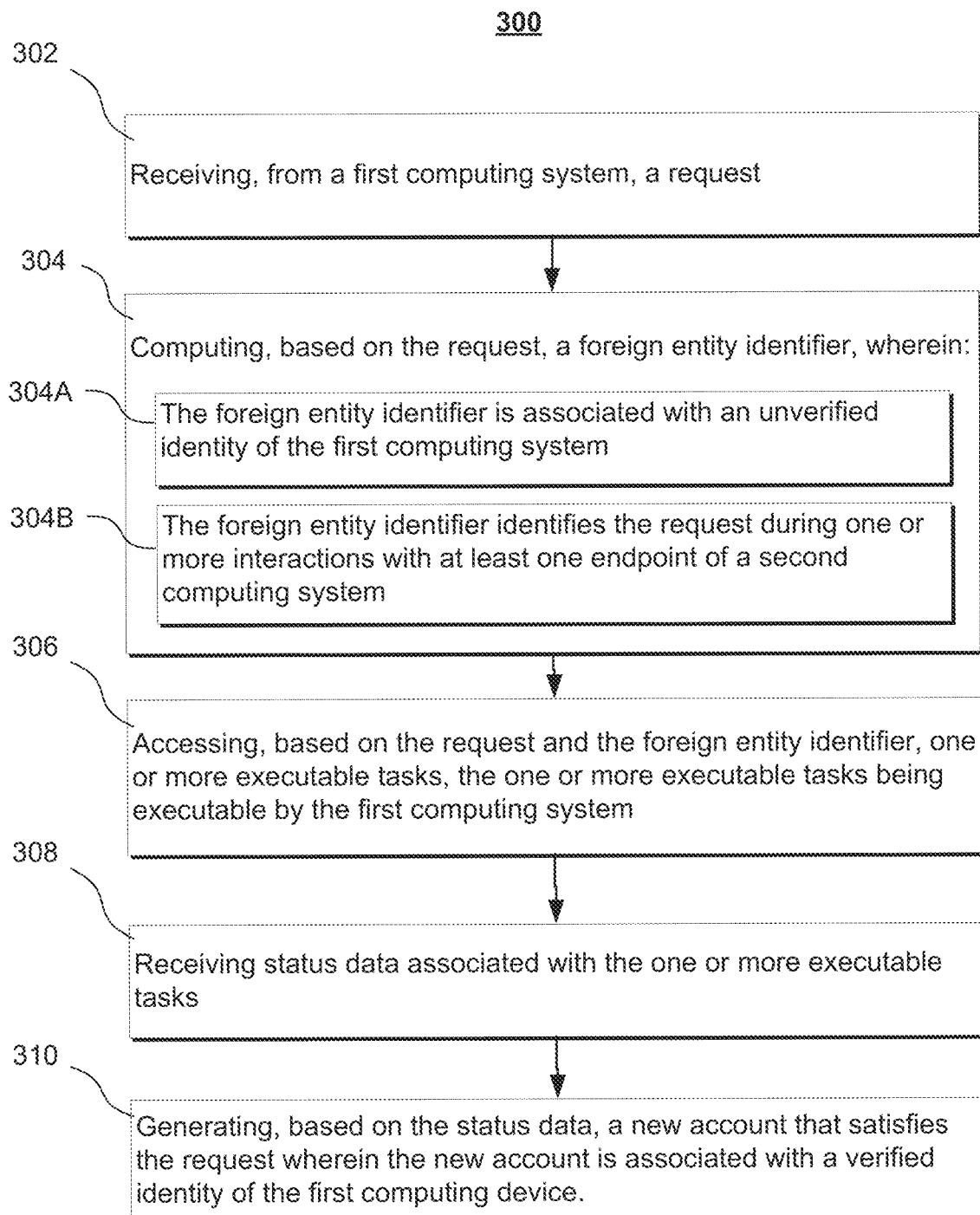
FIG. 3 depicts an example flowchart diagram of an example method according to example aspects of the present disclosure.
Figure 4:
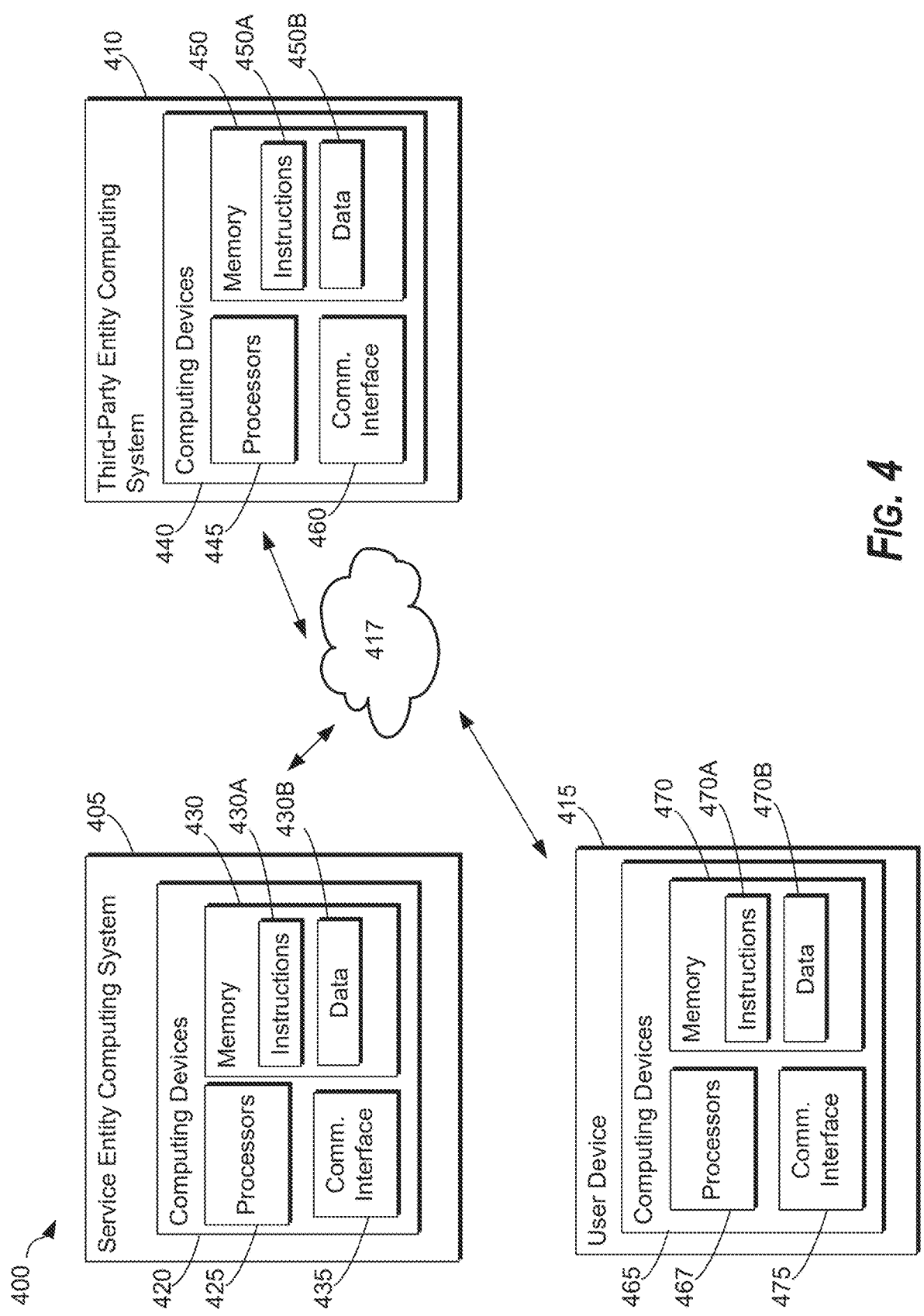
FIG. 4 depicts an example computing ecosystem according to example aspects of the present disclosure.

FIG. 3 depicts a flowchart diagram of an example method according to example aspects of the present disclosure. One or more portion(s) of the method 300 may be implemented by one or more computing devices such as, for example, the computing devices/systems described in FIGS. 1, 2, 4, etc. Moreover, one or more portion(s) of the method 300 may be implemented as an algorithm on the hardware components of the device(s) described herein. For example, a computing system may include one or more processors and one or more non-transitory, computer-readable media storing instructions that are executable by the one or more processors to cause the computing system to perform operations, the operations including one or more of the operations/portions of method 300. FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

In an embodiment, the method 300 may include a step 302 or otherwise begin by receiving, from a first computing system, a request. For instance, a user may submit a request to open a new SBA (small business administration) loan account by interacting with a third-party computing system 102. The third-party computing system 102 may provide the user with access to a variety of SBA loans offered by various underlying service providers. In an embodiment, the request may indicate an interest in a particular SBA loan offered by a particular service provider (e.g., service provider computing system 103). The service provider computing system 103 may receive the request and utilize one or more endpoints 106 to return a response.

In an embodiment, the method 300 may include a step 304 or otherwise continue by computing, based on the request, a foreign entity identifier. For instance, the foreign entity identifier may include a string of alpha numerical characters generated by the service provider computing system 103. The foreign entity identifier may be randomly generated instantaneously upon receipt of the request or pre-determined and assigned to a request when received. In some embodiments, the foreign entity may be unique to a particular request or set of requests (e.g., nested requests for multiple products, services, etc.).

In an embodiment, step 304 may include a step 304A wherein, the foreign entity identifier is associated with an unverified identity of the first computing system. For instance, the third-party computing system 102 may be associated with the service provider computing system 103 and interface with the end users (e.g., user computing devices 101) such that the identity of the user (e.g., associated with the user computing device 101) is unverified. The third-party computing system 102 may utilize an authorization or bearer token which does not identify the end user. For example, the service provider computing system 103 may not be able to associate the request for products or services with user account data 110 specific to the service provider computing system 103.

In an embodiment, step 304 may include a step 304B wherein, the foreign entity identifier provides the request authorization to interact with at least one endpoint of a second computing system. For instance, the service provider computing system 103 may be unable to associate the request to open a new SBA loan account with any user account data 110 (e.g., unable to verify the end user associated with the request) due to the third-party computing system 103 brokering communications between the user computing device 101 and the service provider computing system 103. The service provider computing system 103 may generate a foreign entity identifier which associates the request for the new SBA loan account with communications and data received from the third-party computing system 102 on behalf of the user.

In an embodiment, the method 300 may include a step 306 or otherwise continue by accessing, based on the request and the foreign entity identifier, one or more executable tasks, the one or more executable tasks being executable by the first computing system. For instance, the service provider computing system 103 may determine that one or more executable tasks are necessary to open the new SBA loan account. By way of example, a products and services endpoint 106C associated with the service provider computing system 103 may access one or more executable tasks associated with the SBA loan account. The one or more executable tasks may include software instructions associated with a task to be executed via the user computing device 101. In an embodiment, the one or more executable tasks may include disclosure forms which need to be reviewed, acknowledged, attested etc., by the user before the SBA loan account can be generated. The executable tasks may be transmitted via the third-party computing system 102 to the user computing device 101 for execution.

In an embodiment, the method 300 may include a step 308 or otherwise continue by. or otherwise continue by receiving status data associated with the one or more executable tasks.

For instance, the task execution module 107 associated with the user computing device 101 may receive the executable tasks and actively generate task execution data 108 as the user executes the executable tasks. For instance, the user may be prompted with a first executable task which instructs the user to complete a disclosure form. The user may complete the disclosure form and the task execution module 107 may generate task execution data 108 (e.g., status data) indicating the first executable task has been completed (e.g., completed status). In an embodiment, the task execution module 107 may update the status of the first executable task to completed once executed. In another embodiment, the task execution module 107 may track and update the status of all executable tasks until each have been completed. Once all executable tasks have been completed the service provider computing system 103 may proceed with processing the application for the SBA loan account.

In an embodiment, the method 300 may include a step 310 or otherwise continue by generating, based on the status data, account credentials that verifies an identity of the first computing device. For instance, the user may be prompted with an option to submit the completed SBA loan application after completing each of the executable tasks (e.g., disclosure forms, etc.) assigned. Once the user submits the application the service provider computing system 103 may generate a new SBA account and determine whether the new account can be associated with existing user account data 110 or whether new account credentials need to be generated. For instance, the service provider computing system 103 may determine whether information provided during the application process for the new SBA loan account matches an existing set of user credentials. If there are no matching credentials, the service provider computing system 103 may generate an authorization token and pass the token to the third-party computing system 102 to be used to verify the identity of the user computing device in subsequent communications.

FIG. 400 depicts a block diagram of an example system 400 for implementing systems and methods according to example embodiments of the present disclosure. The example system 400 illustrated in FIG. 400 is provided as an example only. The components, systems, connections, and/or other aspects illustrated in FIG. 400 are optional and are provided as examples of what is possible, but not required, to implement the present disclosure. The example system 400 can include a service entity computing system 405 (e.g., that is associated with a service entity, etc.). The example system 400 can include a third-party entity computing system 410 (e.g., that is associated with a third-party entity such as a third-party service that interfaces with users, etc.). The example system 400 can include a user device 415 (e.g., user device of the user, etc.). One or more of the service entity computing system 405, the third-party entity computing system 410, or the user device 415 can be communicatively coupled to one another over one or more communication network(s) 417. The networks 417 can correspond to any of the networks described herein.

The computing device(s) 420 of the service entity computing system 405 can include processor(s) 425 and a memory 430. The one or more processors 425 can be any suitable processing device (e.g., a processor core, a microprocessor, an ASIC, a FPGA, a controller, a microcontroller, etc.) and can be one processor or a plurality of processors that are operatively connected. The memory 430 can include one or more non-transitory computer-readable storage media, such as RAM, ROM, EEPROM, EPROM, one or more memory devices, flash memory devices, data registrar, etc., and combinations thereof.

The memory 430 can store information that can be accessed by the one or more processors 425. For example, the memory 430 (e.g., one or more non-transitory computer-readable storage mediums, memory devices, etc.) can include computer-readable instructions 430A that can be executed by the one or more processors 425. The instructions 430A can be software written in any suitable programming language or can be implemented in hardware. Additionally, or alternatively, the instructions 430A can be executed in logically and/or virtually separate threads on processor(s) 425.

For example, the memory 430 can store instructions 430A that when executed by the one or more processors 425 cause the one or more processors 425 (e.g., of the service entity computing system 405, etc.) to perform operations such as any of the operations and functions of the computing system(s) (e.g., operations computing system, etc.) described herein (or for which the system(s) are configured), one or more of the operations and functions for communicating between the computing systems, one or more portions/operations of method 300 and/or one or more of the other operations and functions of the computing systems described herein.

The memory 430 can store data 430B that can be obtained (e.g., acquired, received, retrieved, accessed, created, stored, etc.). The data 430B can include, for example, any of the data/information described herein. In some implementations, the computing device(s) 420 can obtain data from one or more memories that are remote from the service entity computing system 405.

The computing device(s) 420 can also include a communication interface 435 used to communicate with one or more other system(s) remote from the service entity computing system 405, such as third-party entity computing system 410, and/or user device 415. The communication interface 435 can include any circuits, components, software, etc. for communicating via one or more networks (e.g., network(s) 417, etc.). The communication interface 435 can include, for example, one or more of a communications controller, receiver, transceiver, transmitter, port, conductors, software and/or hardware for communicating data.

The third-party entity computing system 410 can include one or more computing device(s) 440 that are remote from the service entity computing system 405, and the user device 415. The computing device(s) 440 can include one or more processors 445 and a memory 450. The one or more processors 445 can be any suitable processing device (e.g., a processor core, a microprocessor, an ASIC, a FPGA, a controller, a microcontroller, etc.) and can be one processor or a plurality of processors that are operatively connected. The memory 450 can include one or more tangible, non-transitory computer-readable storage media, such as RAM, ROM, EEPROM, EPROM, one or more memory devices, flash memory devices, data registrar, etc., and combinations thereof.

The memory 450 can store information that can be accessed by the one or more processors 445. For example, the memory 450 (e.g., one or more tangible, non-transitory computer-readable storage media, one or more memory devices, etc.) can include computer-readable instructions 450A that can be executed by the one or more processors 445. The instructions 450A can be software written in any suitable programming language or can be implemented in hardware. Additionally, or alternatively, the instructions 450A can be executed in logically and/or virtually separate threads on processor(s) 445.

For example, the memory 450 can store instructions 450A that when executed by the one or more processors 445 cause the one or more processors 445 to perform operations such as any of the operations and functions of the computing system(s) described herein (or for which the system(s) are configured), one or more of the operations and functions for communicating between computing systems, one or more portions/operations of method 300, and/or one or more of the other operations and functions of the computing systems described herein. The memory 450 can store data 450B that can be obtained. The data 450B can include, for example, any of the data/information described herein.

The computing device(s) 440 can also include a communication interface 460 used to communicate with one or more system(s) that are remote from the system 410. The communication interface 460 can include any circuits, components, software, etc. for communicating via one or more networks (e.g., network(s) 417, etc.). The communication interface 460 can include, for example, one or more of a communications controller, receiver, transceiver, transmitter, port, conductors, software and/or hardware for communicating data.

The user device 415 can include one or more computing device(s) 465 that are remote from the service entity computing system 405, and the third-party entity computing system 410. The computing device(s) 465 can include one or more processors 467 and a memory 470. The one or more processors 470 can be any suitable processing device (e.g., a processor core, a microprocessor, an ASIC, a FPGA, a controller, a microcontroller, etc.) and can be one processor or a plurality of processors that are operatively connected. The memory 470 can include one or more tangible, non-transitory computer-readable storage media, such as RAM, ROM, EEPROM, EPROM, one or more memory devices, flash memory devices, data registrar, etc., and combinations thereof.

The memory 470 can store information that can be accessed by the one or more processors 467. For example, the memory 470 (e.g., one or more tangible, non-transitory computer-readable storage media, one or more memory devices, etc.) can include computer-readable instructions 470A that can be executed by the one or more processors 467. The instructions 470A can be software written in any suitable programming language or can be implemented in hardware. Additionally, or alternatively, the instructions 470A can be executed in logically and/or virtually separate threads on processor(s) 467.

For example, the memory 470 can store instructions 470A that when executed by the one or more processors 467 cause the one or more processors 467 to perform operations such as any of the operations and functions of the computing system(s) (e.g., user devices, etc.) described herein (or for which the user device(s) are configured), one or more of the operations and functions for communicating between systems, one or more portions/operations of method 300, and/or one or more of the other operations and functions of the computing systems described herein. The memory 470 can store data 470B that can be obtained. The data 470B can include, for example, any of the data/information described herein.

The computing device(s) 465 can also include a communication interface 475 used to communicate computing device/system that is remote from the user device 415, such as third-party entity computing system 410, or service entity computing system 405. The communication interface 475 can include any circuits, components, software, etc. for communicating via one or more networks (e.g., network(s) 417, etc.). The communication interface 475 can include, for example, one or more of a communications controller, receiver, transceiver, transmitter, port, conductors, software and/or hardware for communicating data.

The network(s) 417 can be any type of network or combination of networks that allows for communication between devices. In some implementations, the network(s) 417 can include one or more of a local area network, wide area network, the Internet, secure network, cellular network, mesh network, peer-to-peer communication link and/or some combination thereof and can include any number of wired or wireless links. Communication over the network(s) 417 can be accomplished, for example, via a communication interface using any type of protocol, protection scheme, encoding, format, packaging, etc.

Computing tasks discussed herein as being performed at certain computing device(s)/systems can instead be performed at another computing device/system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some implementations are described with a reference numeral, for example illustrated purposes and is not meant to be limiting.

Although claims included herein may be shown to be dependent on other certain claims, any of the claims can depend on one or more other claims, including any preceding claims.

What is claimed is:

1. A service provider computing system comprising:
   one or more processors;

one or more non-transitory computer-readable media storing instructions that, are executable by the one or more processors to perform operations, the operations comprising:
  receiving, from a first computing system, a request;
  computing, based on the request, a foreign entity identifier, wherein:
    the foreign entity identifier is associated with an unverified identity of the first computing system in the service provider computing system, the foreign entity identifier identifies the request without identifying the identity of the first computing system during one or more interactions with at least one endpoint of the service provider computing system;
  accessing, based on the request and the foreign entity identifier, one or more executable tasks, the one or more executable tasks being executable by the first computing system;
  receiving status data associated with the one or more executable tasks; and
  generating, based on the status data, a new account that satisfies the request wherein the new account is associated with a verified identity of the first computing device.

2. The computing system of claim 1, wherein the operations further comprise:
  generating account credentials, wherein the account credentials verify the identity of the first computing system.

3. The computing system of claim 2, wherein the account credentials comprise an authorization token.

4. The computing system of claim 2, wherein the account credentials invalidate the foreign entity identifier.

5. The computing system of claim 1, wherein the operations further comprise:
  receiving from a third computing system the request, wherein:
    the third computing system brokers the one or more interactions between the first computing system and the service provider computing system, and
    the one or more interactions comprise the foreign entity identifier.

6. The computing system of claim 5, wherein at least one interaction of the one or more interaction between the first computing system and the service provider computing system comprise one or more command instructions to generate a user interface display, the user interface display rendered on a user interface associated with the first computing system.

7. The computing system of claim 5, wherein the third computing system stores a user account credential to identify the first computing system and the user account credential is different than the foreign entity identifier.

8. The computing system of claim 1, wherein the foreign entity identifier comprises a token associated with the request.

9. The computing system of claim 1, wherein computing a foreign entity identifier, comprises generating a data object associated with user account information.

10. The computing system of claim 1, wherein the first computing system is associated with a user computing device.

11. The computing system of claim 1, wherein the request is associated with a request for a financial product or a financial service.

12. The computing system of claim 1, wherein the one or more executable tasks are associated with one or more disclosure forms.

13. The computing system of claim 12, wherein the one or more executable tasks are associated with attestation workflow, the attestation workflow is associated with an attestation or acknowledgement of the one or more disclosure forms.

14. A computer-implemented method comprising:
  receiving, by a service provider computing system, from a first computing system, a request;
  computing, by the service provider computing system, based on the request, a foreign entity identifier, wherein:
    the foreign entity identifier is associated with an unverified identity of the first computing system in the service provider computing system, the foreign entity identifier identifies the request without identifying the identity of the first computing system during one or more interactions with at least one endpoint of the service provider computing system;
  accessing, by the service provider computing system, based on the request and the foreign entity identifier, one or more executable tasks, the one or more executable tasks being executable by the first computing system;
  receiving, by the service provider computing system, status data associated with the one or more executable tasks; and
  generating, by the service provider computing system, based on the status data, a new account that satisfies the request wherein the new account is associated with a verified identity of the first computing device.

15. The computer-implemented method of claim 14, further comprising:
  generating account credentials, wherein the account credentials verify the identity of the first computing system.

16. The computer-implemented method of claim 15, wherein the account credentials comprise an authorization token.

17. The computer-implemented method of claim 15, wherein the account credentials invalidate the foreign entity identifier.

18. The computer-implemented method of claim 14, further comprising:
  receiving from a third computing system the request, wherein:
    the third computing system brokers the one or more interactions between the first computing system and the service provider computing system, and
    the one or more interactions comprise the foreign entity identifier.

19. The computer-implemented method of claim 18, wherein at least one interaction of the one or more interaction between the first computing system and the service provider computing system comprise one or more command instructions to generate a user interface display, the user interface display rendered on a user interface associated with the first computing system.

20. A non-transitory computer-readable media storing instructions that when executed by one or more processors cause the one or more processors to perform operations, the operations comprising:
  receiving, by a service provider computing system, from a first computing system, a request;

computing, by the service provider computing system, based on the request, a foreign entity identifier, wherein:
  the foreign entity identifier is associated with an unverified identity of the first computing system in the service provider computing system, the foreign entity identifier identifies the request without identifying the identity of the first computing system during one or more interactions with at least one endpoint of the service provider computing system;
accessing, by the service provider computing system, based on the request and the foreign entity identifier, one or more executable tasks, the one or more executable tasks being executable by the first computing system;
receiving by the service provider computing system, status data associated with the one or more executable tasks; and
generating, by the service provider computing system, based on the status data, a new account that satisfies the request wherein the new account is associated with a verified identity of the first computing device.

* * * * *